Figure 1:
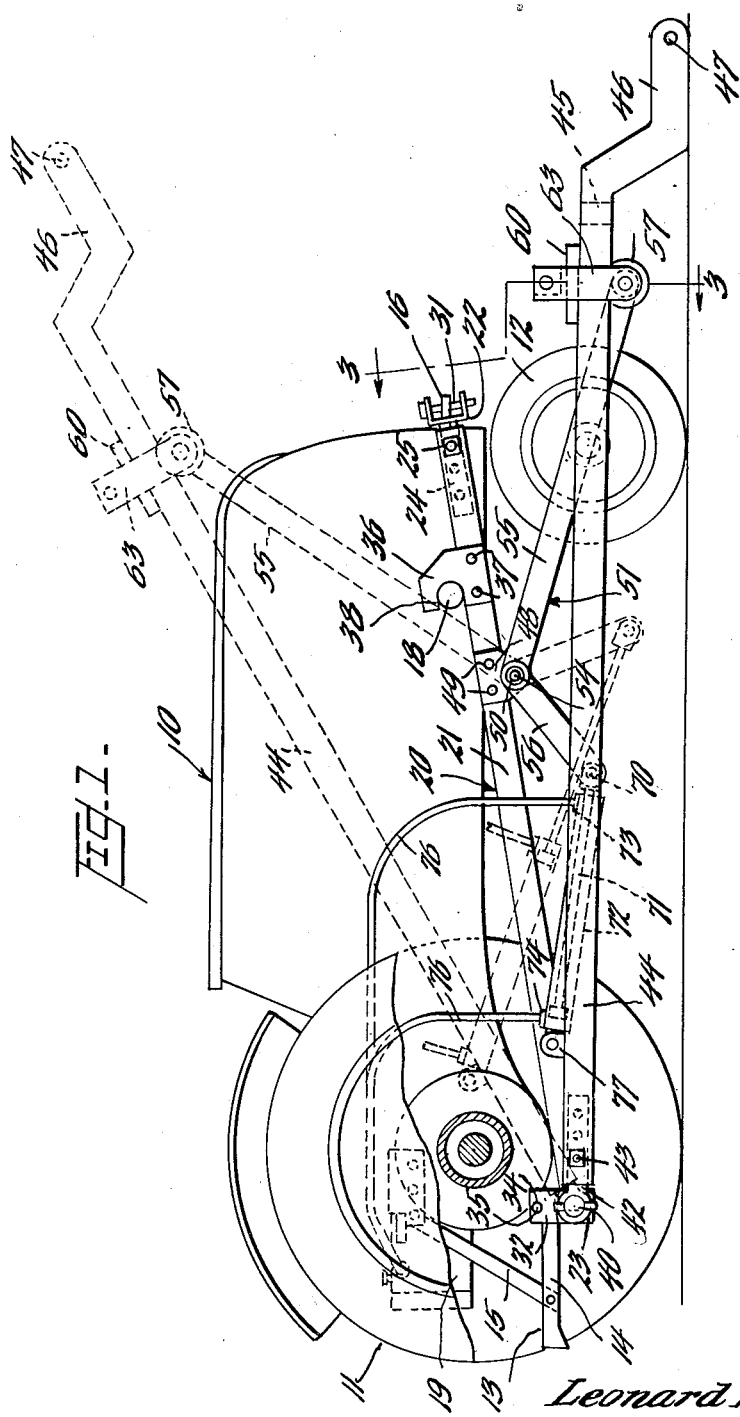

Nov. 17, 1953    L. H. STEER    2,659,572
TRACTOR LIFTING APPARATUS
Filed April 22, 1952    3 Sheets-Sheet 1

INVENTOR
Leonard H. Steer,
BY Parker and Walsh.
ATTORNEYS

Nov. 17, 1953    L. H. STEER    2,659,572
TRACTOR LIFTING APPARATUS
Filed April 22, 1952    3 Sheets-Sheet 2
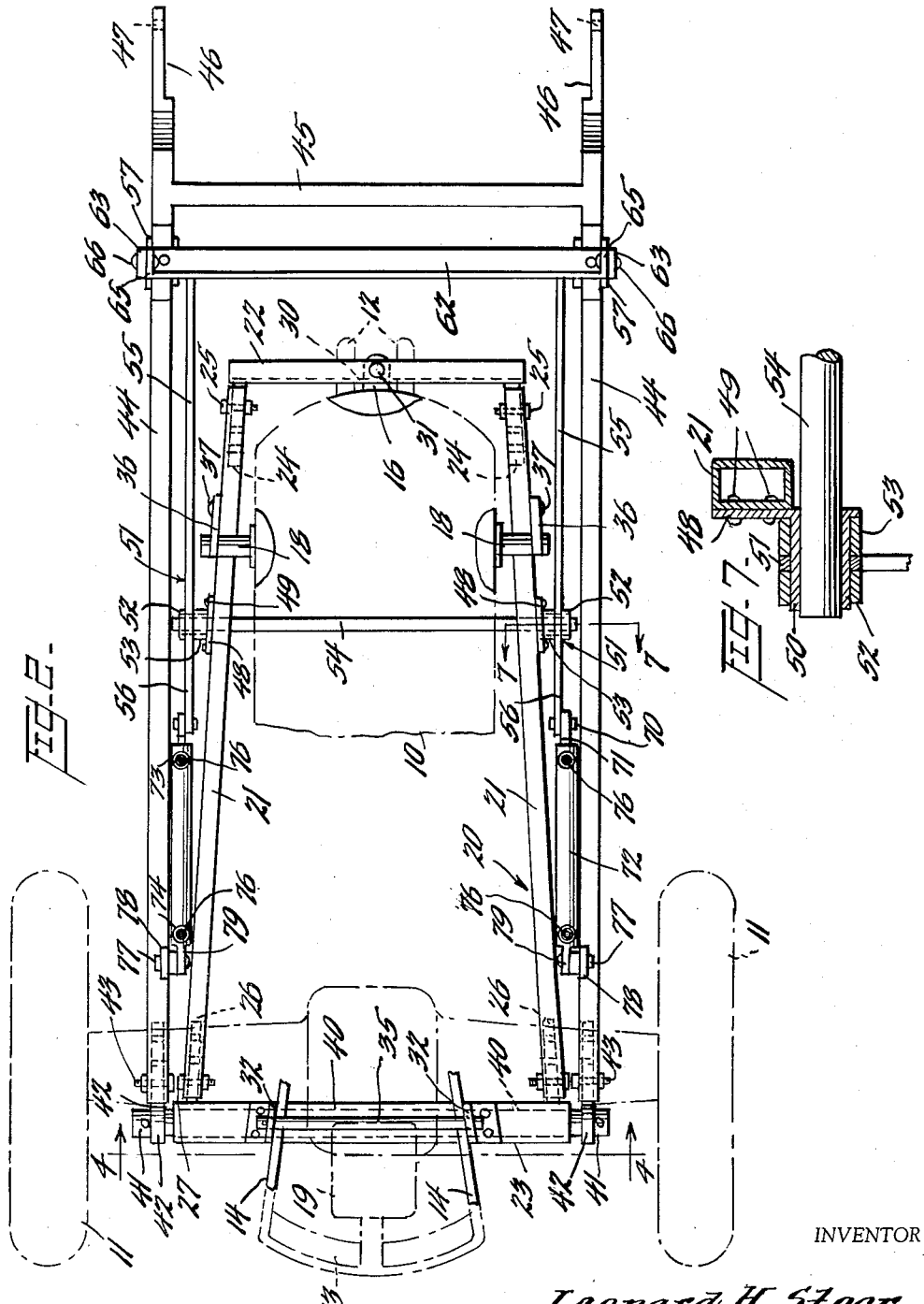
INVENTOR
Leonard H. Steer,
BY Parker and Walsh.
ATTORNEYS

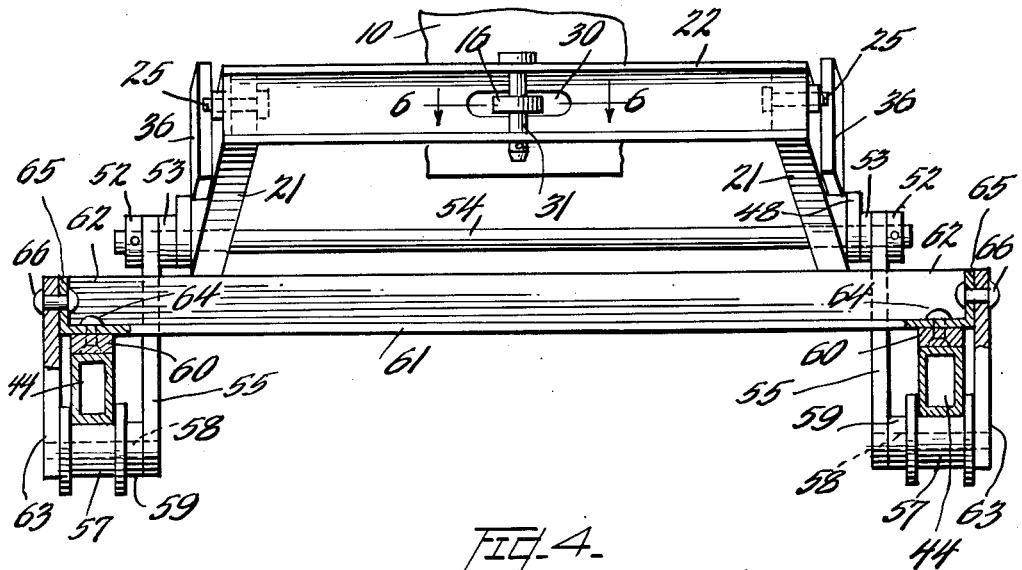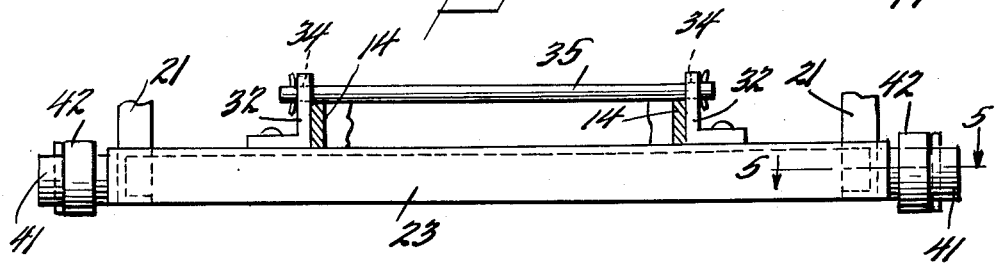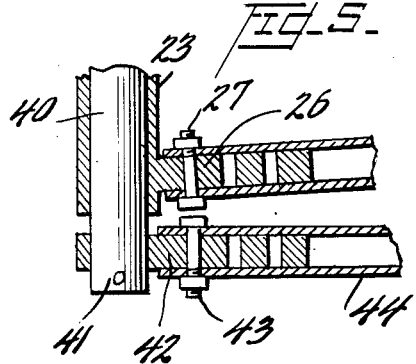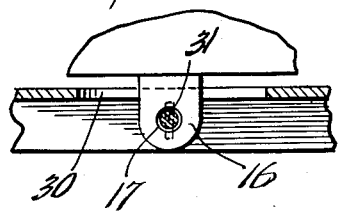

Patented Nov. 17, 1953

2,659,572

UNITED STATES PATENT OFFICE 2,659,572

TRACTOR LIFTING APPARATUS

Leonard H. Steer, Allison, Iowa

Application April 22, 1952, Serial No. 283,677

11 Claims. (Cl. 254—124)

This invention relates to lifting apparatus for tractors.

An important object of the invention is the provision of lifting apparatus for tractors which is formed as a complete unit and characterized by the ease and simplicity with which it may be attached to and detached from a tractor.

A further object of the invention is the provision of tractor lifting apparatus which when attached to a tractor has a relatively low center of gravity whereby greater maneuverability and stability of the tractor is achieved during operation of such apparatus.

Another object of the invention is the provision of apparatus of the indicated type having a plurality of lifting beams positionable to transmit force from the structure to an object to be moved and/or lifted in a substantially horizontal plane spaced below the center of gravity of the tractor and approximately parallel to the tractor drawbar line of draft, whereby a more effective pushing force can be exerted with less slippage of the tractor driving wheels.

Still another object of the invention is the provision of tractor lifting apparatus having hydraulically operated lifting mechanisms, wherein an improved mechanical arrangement is provided for relieving the hydraulically operated mechanisms of a considerable portion of the load and shock when the lifting apparatus is in its raised load transporting position.

A further object of the invention is the provision of hydraulically actuated lifting apparatus wherein the hydraulically actuated mechanisms are connected between individually movable elements of the apparatus, whereby a more effective lifting and/or lowering action is obtained.

A still further object of the invention is the provision of hydraulically actuated tractor lifting apparatus wherein an improved mechanical lifting arrangement is provided for rendering the hydraulic means more effective and efficient in all stages of operation of the apparatus.

Another object of the invention is the provision of a tractor lifting apparatus actuated by double-acting hydraulically operated cylinder and piston mechanisms whereby the apparatus may be employed for digging, driving objects into the ground, and other analogous uses.

These and other objects and advantages of the invention will become more apparent from the accompanying drawings and the following detailed description, illustrating and describing a preferred embodiment of the invention.

In the drawings:

Figure 1 is a side elevational view of the lifting apparatus of the invention attached to a conventional type of tractor, Figure 2 is a plan view of the apparatus shown in Figure 1, the tractor being shown in broken lines, Figure 3 is a cross-sectional view of the tractor lifting apparatus taken on the line 3—3 of Figure 1, Figure 4 is a vertical cross-sectional view taken on the line 4—4 of Figure 2, Figure 5 is a horizontal cross-sectional view of a portion of the apparatus taken on line 5—5 of Figure 4, Figure 6 is a horizontal cross-sectional view of the portion of the apparatus taken on line 6—6 of Figure 3, and Figure 7 is a cross-sectional view taken on the line 7—7 of Figure 2.

Referring to Figure 1, the numeral 10 generally designates a tractor having rear driving wheels 11 and front steering wheels 12. The rear driving wheels 11 are of the usual large type mounted on each side of the chassis of the tractor, as clearly shown in Figure 2. The front steering wheels 12 are of the small type positioned relatively closely together on each side of the center line of the tractor.

At its rear, the tractor 10 is provided with a drawbar 13 having rearwardly diverging side edges 14. The drawbar 13 is secured to the chassis of the tractor substantially below the center line of the rear drive wheels 11 and is braced by bars 15 which depend from the frame of the machine. At its front end, the tractor 10 is provided with a forwardly extending clip 16, secured to the front pedestal post of the tractor, and having an opening 17 therein for a purpose to be described.

The tractor 10 is also provided with front tool mounting stub pipes 18 and a hydraulic pump 19. The stub pipes 18 project outwardly from the sides of the tractor adjacent the front thereof, and cooperate with a portion of the lifting apparatus as will appear more clearly hereinafter. The hydraulic pump 19 is mounted at the rear of the tractor, as clearly shown in Figures 1 and 2, and is provided with suitable inlet and outlet ports controlled by two-way valves for a purpose to be described.

The improved lifting apparatus of the invention comprises a sub-frame 20, adapted to be substantially rigidly attached to the tractor 10, and on which is mounted the specific lifting mechanism hereinafter described. This provides a unitary assembly which may be easily and quickly attached to, or detached from, the tractor.

The sub-frame 20 is made up of the longitudinally extending, forwardly converging side frame members 21 and the front and rear transversely extending frame members 22 and 23. While the particular shapes and forms of the frame members may be varied, it is preferred to make the side frame members 21 of rectangular box-like steel beams and the end frame members 22 and 23 of U-shaped angle iron.

The front frame member 22, formed of U-shaped angle iron as stated, is disposed with the flanged legs thereof extending toward the front of the vehicle. Attached to the base of the member 22, as by welding or the like, are tongues 24 which extend rearwardly from the ends of the member 22 into the ends of the side frame members 21. Aligned openings are provided in the tongues 24 and frame members 21 through which bolts 25 are inserted to secure the two together. The rear frame member 23 is disposed with the flanged legs thereof extending downwardly and is similarly provided with tongues 26 extending into the rear ends of the legs of the side frame members 21 and secured thereto by the bolts 27.

The sub-frame 20 is attached to and supported by the front pedestal post clip 16 and the rear drawbar 13. For this purpose, the base of the front frame member 22 is provided substantially centrally thereof with an elongated slot 30 through which the clip 16 may be extended until the opening 17 therein is aligned with corresponding openings in the flanged legs of the member 22. A pin 31 may then be inserted through the aligned openings as clearly shown in Figure 1 to anchor the front portion of the sub-frame 20 to the tractor.

The sub-frame 20 is secured to the drawbar 13 by ears 32, bolted, welded or otherwise secured to the rear frame member 23, and provided with aligned openings 34 to receive the pin 35. The pin 35 is positioned above, and rests on, the drawbar 13, thereby serving to attach the rear end of the sub-frame 20 to the tractor. The ears 32 extend upwardly on opposite sides of the drawbar 13 and are inclined outwardly slightly toward the rear of the device so as to rest flatly against the side edges 14 of the drawbar. By virtue of this arrangement, it will be apparent that any rearward thrust on the sub-frame 20 will force the ears 32 into wedging engagement with the side edges 14 of the drawbar thereby absorbing such thrusts and preventing further rearward movement of the sub-frame 20.

To further assist in transmitting forces from the sub-frame 20 to the chassis of the tractor, the side frame members 21 carry brackets 36, positioned adjacent the forward ends thereof, and secured thereto by rivets or bolts 37. The brackets 36 extend upwardly from the frame members 21 and are provided with recesses 38 for receiving the stub pipes 18. The sub-frame supporting and force transmitting functions of the brackets 36 will be readily apparent.

Welded or otherwise secured between the depending flanged legs of the rear frame member 23 is a tubular shaft 40 having portions 41 thereon which project beyond the ends of the rear frame member. Journaled on the projecting end portions 41 of the shaft 40 are arms 42. These arms are secured by bolts 43 to lifting beams 44. The beams 44 are preferably of rectangular steel construction, similar to the side frame members 21, and extend forwardly, in parallel relation, beyond the front wheels of the tractor. The lifting beams 44 are connected adjacent their front ends by a cross brace 45 welded or otherwise secured thereto in any suitable manner. At their forward ends the beams 44 are provided with downwardly offset portions 46 having openings 47 therein for receiving the usual or any desired type of fitting.

Intermediate the ends thereof the frame members 21 are provided with depending brackets 48, secured thereto by rivets or bolts 49 and having outwardly extending sleeve bearings 50. Bell cranks 51 are journaled on the bearing sleeves 50 and retained in position thereon between washers 52 and 53. As will be more clearly apparent hereinafter, the bell cranks 51 are subjected to substantial stresses during operation of the device, which stresses in turn are transmitted to the sleeves 50, brackets 48, and side frame members 21. Therefore, in order to strengthen and rigidify these elements it has been found desirable to utilize a tubular shaft 54. The shaft 54 extends transversely of the sub-frame 20 to and through the side frame members 21 and the sleeves 50, as clearly shown in Figure 7. The shaft 54 slidably engages the sleeves 50 and may be removed for a purpose to be described.

The bell cranks 51 are each provided with a relatively long forwardly extending arm 55 and a shorter rearwardly extending arm 56. The long arms 55 of the bell cranks are slidably connected to the lifting beams 44 adjacent the forward ends thereof. Such slidable connections preferably comprise flanged rollers 57, mounted on shafts 58 secured in the ends of the long arms 55 of the bell cranks. The rollers 57 rollably engage the bottom sides of the lifting beams 44 and may, if desired, be spaced from the arms 55 by washers 59.

The slidable connections further include means for engaging the top sides of the lifting beams 44 to force them downwardly when the apparatus is used for digging, driving and the like. Such means may desirably comprise blocks or slides 60, preferably formed of wood, for example oak, previously soaked in oil, and secured to one flange 61 of a transversely extending angle iron 62 by rivets or bolts 64. The angle iron 62 is carried by vertically extending plates 63, mounted on the shafts 58 outwardly of the rollers 57. The angle irons 62 may be secured to the plates 63 by turning the ends of the bottom flange 61 upwardly as shown at 65 and then riveting the upturned portions 65 to the plate with rivets 66.

The short arms 56 of the bell cranks 51 are pivotally connected at their ends, as at 70, to the piston rods 71 of hydraulically operated cylinder and piston mechanisms 72. In accordance with the invention, the hydraulically operated mechanisms 72 are of the double-acting type, provided with inlet and outlet ports 73 and 74 at the ends thereof, so that fluid may be introduced at either of the ends of the hydraulic cylinders to force the pistons 75 thereof in either direction. The inlet and outlet ports 73 and 74 of these devices are connected to the pump 19 by flexible connections 76 so that fluid may be selectively supplied to either of the ends of the hydraulic mechanisms to force the pistons in the desired direction.

At the ends thereof opposite their points of connection with the arms 56, the hydraulically operated cylinder and piston mechanisms 72 are pivotally connected as at 77 to ears 78, secured to and upstanding from the lifting beams 44. Such connections may desirably be made by flattening the ends of the hydraulic cylinders of the mechanisms 72, as shown at 79, or alternatively by securing a flattened extension on the cylinders. By virtue of this arrangement, it will be noted that the hydraulically operated cylinder and piston mechanisms 72 are connected to movable parts of the apparatus, namely, the bell crank arms 56 and the lifting beams 44. It will further be noted that the angular relationship of the arms 56 and the mechanisms 72 is such that maximum use is made of the thrust exerted by the mechanisms 72 throughout the full swinging movement of the arms 56.

Operation

The lifting apparatus of the invention is very simply and easily attached to a tractor in the following manner. The apparatus is placed on the ground or other substantially flat surface, for example, a concrete floor or platform, and the pin 35 and shaft 54 withdrawn to one side of the apparatus or, if desired, removed entirely. The tractor is then positioned to the rear of the apparatus with the longitudinal center line thereof approximately aligned with the longitudinal center line of the sub-frame 20, and the tractor then moved forward until the forward edge of the front pedestal post clip 16 is immediately in rear of the slot 30 in the front frame member 22. During such movement of the tractor, the front wheels thereof pass over the rear frame member 23 between the ears 32 thereof and then move forwardly between the side frame members 21. The rear wheels of the tractor straddle the apparatus as clearly shown in Figure 2. After the tractor has been moved forward as above indicated, the front end of the sub-frame 20 is lifted up until the slot 30 is opposite the clip 16. The tractor is then moved forward sufficiently to insert the clip 16 through the slot 30 after which the pin 31 may be inserted in position through the aligned openings in the clip 16 and the flanged legs of the front frame member 22.

Where the brackets 36 are used, these may be engaged with the stub pipes 18 at the same time the connection with the front pedestal clip 16 is made. This may require some lifting of the rear portion of the sub-frame to align the slots 38 of the brackets 36 with the stub pipes 18. Alternatively, if the stub pipes 18 are removable, they may be removed until the rear portion of the sub-frame 20 is secured in position, as hereinafter described, after which they may again be secured in position with intermediate portions thereof positioned in the slots 38.

Attachment of the rear portion of the apparatus is very simply accomplished merely by lifting the rear end of the sub-frame 20 until the openings 34 in the ears 32 are above the top of the drawbar 13 and then inserting the pin 35 through the openings 34 until it assumes the position shown in Figure 2. The cross shaft 54 is then inserted into the tubular sleeves 50 to assume the position shown in Figure 2 and the hydraulic lines 76 connected to the pump 19 as shown in Figure 1. The apparatus is now ready to be placed in operation.

In the utilization of the apparatus for lifting and transporting objects, the lifting beams 44 may be moved between the loading and unloading position shown in full lines in Figure 1 and the transporting or carrying position shown in broken lines in the same figure. This is accomplished by setting the valves of the pump 19 to deliver fluid to the left ends, as viewed in Figure 1, of the hydraulic piston and cylinder mechanisms 72. This produces forces on the pistons of the hydraulically operated mechanisms 72 which tend to move the pistons and rods 71 to the right, as shown in Figure 1, and simultaneously exerts an equal and opposite force on the ends of the hydraulic cylinders of such mechanisms, tending to force them to the left as shown in Figure 1. Since the hydraulically operated mechanisms 72 are connected at their opposite ends to the beams 44 and the arms 56 of the bell cranks 51, these oppositely directed forces both act to raise the lifting beams, the one through direct action on the beams, and the other through action on the bell cranks 51 which are slidably connected to the beams.

In the movement of the lifting beams 44 from their loading to their transporting position, the bell cranks 51 and the hydraulically operated mechanisms 72 move to the dotted line positions shown in Figure 1. During such movement, it will be noted that the angular relation between the mechanisms 72 and the lifting beams 44, on the one hand, and the mechanisms 72 and the bell crank arms 56 on the other hand, is constantly changing. In the case of the lifting beams, this changing relation results in a gradually increasing component of force being applied to lift the beams. In the case of the bell cranks, this changing relation results first in a gradual increase, and then a gradual decrease, in the component of force tending to swing the bell cranks. However, it will be noted, that the component of force tending to swing the bell cranks is approximately the same in the full and dotted line positions of the parts, and that the arrangement is such as to obtain the maximum effect from the hydraulically operated mechanisms 72 throughout the full arc of swing of the arms 56.

As the lifting beams 44 are raised above the line of the sub-frame 20, the arms 55 of the bell cranks 51 assume a greater proportion of the load of such beams, with the result that there is a gradual decrease in the component of force required to swing the arms 55. This reaches a maximum when the parts are in the broken line positions shown in Figure 1, at which point the arms 55 take a substantial part of the load of the beams, requiring a minimum of force to be exerted by the hydraulic mechanisms 72 to hold the bell cranks and beams in the broken line positions. This relieves the hydraulic mechanisms of considerable stresses and strains during the transporting of objects to be carried from one place to another, and as a consequence such mechanisms have longer life and are less subject to breakdown.

It will be apparent from the above that the arrangement of parts is such as to secure maximum effectiveness and efficiency from the hydraulic mechanisms 72 as well as to relieve them from shock and strain when the beams are in transporting position. Increased effectiveness in the operation of the apparatus is also obtained by virtue of the slidable connection between the bell crank arms 55 and the beams whereby the rollers 57 rollably engage the bottom sides of the beams to raise and support them in any desired position. Another feature of the slidable connection is the provision of the blocks 60 and associated parts which, in combination with the double-acting hydraulic mechanisms 72, permit the device to be used for digging, driving and the like. In carrying out such operations, a continuous or intermittent force may be applied to the tops of the beams by the bell cranks 51, blocks 60 and associated mechanism, by suitable manipulation of the two-way pump valves which control the operation of the hydraulic mechanisms 72.

The lifting apparatus may be detached from the tractor, very simply and easily, merely by following the reverse procedure outlined hereinabove for attaching it. Thus it is merely necessary to remove the pins 35 and 31, lower the apparatus to the ground, remove the shaft 54, and then back the tractor until it passes over the rear frame member 23 between the ears 32. When so detached, nothing remains on the tractor after it has been backed or driven out, except the front pedestal clip 16 which can be used as a means of pushing and backing loads about. The apparatus thus provides a complete and unitary structure adapted for easy and quick attachment to most any of the standard Row Crop tractors.

By attaching the apparatus below the rear drawbar of the tractor a relatively low center of gravity is obtained which greatly facilitates maneuverability and minimizes the tendency to tilt or turn over when the machine is being used for transporting loads. Furthermore, it will be noted that when the lifting beams are in their lower position for pushing objects the line of the pushing force exerted is below the axle housing level and along a substantially horizontal line, with the result that there is little tendency to raise the driving wheels with consequent slippage. By virtue of this arrangement more effective pushing force is exerted on objects to be moved than with less slippage of the driving wheels.

It will further be noted that no part of the lifting apparatus is disposed above the tractor except when the beams are in raised position. This permits the tractor equipped with the apparatus, to be driven through any opening which would accommodate the tractor alone. In addition, it also permits a clear view during certain phases of operation of the apparatus.

It will be apparent that the present invention provides an improved lifting apparatus for tractors which is simple in construction and effective in operation, and which is formed as a complete and unitary structure adapted for quick and easy attachment to, and detachment from, a tractor. While a preferred form of the invention has been illustrated and described, it should be understood that the invention is not limited to specific structural details except as included in the following claims.

I claim:

1. A unitary lifting attachment for tractors comprising a frame having longitudinally extending side frame members connected adjacent their ends by front and rear transversely extending frame members, means for securing the front and rear frame members to the front and rear portions of a tractor with the side frame members positioned on either side thereof, lifting beams pivotally mounted on opposite sides of said frame adjacent the rear thereof and of a length to extend forwardly beyond the front end of a tractor, and means for simultaneously raising and lowering said lifting beams comprising bell cranks pivotally mounted on said longitudinally extending side frame members intermediate the ends thereof, one arm of each of said bell cranks being slidably connected with the forward portion of each lifting beam, and a hydraulic cylinder and piston mechanism connected at one end thereof to the other arm of each bell crank and at the other end thereof to each lifting beam adjacent its rear end.

2. A unitary lifting attachment for tractors comprising a frame having longitudinally extending side frame members secured in spaced apart relation, means for securing said frame to a tractor with the side frame members positioned on either side thereof, a pair of lifting beams pivotally mounted on said side frame members adjacent the rear ends thereof and adapted to extend beyond the front of a tractor on which the frame may be mounted, bell cranks pivotally mounted on said side frame members intermediate the ends thereof, one arm of each bell crank being slidably connected to the adjacent lifting beam forwardly thereof, and a pair of fluid operated cylinder and piston mechanisms for actuating said bell cranks, each of said mechanisms being connected at one end to the other arm of each bell crank and at its other end to the adjacent lifting beam rearwardly thereof, the points of connection of said mechanisms with said lifting beams being above the points of connection of said mechanisms with said other bell crank arms whereby said mechanisms exert upward components of force on said beams to assist in lifting them.

3. A unitary lifting attachment for tractors comprising a frame having longitudinally extending side frame members connected adjacent their ends by front and rear transversely extending frame members, said front frame member having a slot therein for receiving a front pedestal post clip of a tractor, a pair of ears secured to and extending upwardly from said rear frame member, said ears being spaced apart to receive therebetween the drawbar of a tractor, lifting beams pivotally mounted on said frame adjacent the rear thereof, and means mounted on said frame for lifting said beams.

4. A unitary lifting attachment for tractors comprising a frame having longitudinally extending side frame members connected adjacent their ends by front and rear transversely extending frame members, means associated with said front frame member for fixedly securing the front end of said frame to the front pedestal post of a tractor, means associated with said rear frame member for fixedly securing the rear of said frame to the drawbar of a tractor, bearing means projecting outwardly from said rear frame member at opposite ends thereof, lifting beams pivotally mounted on said bearing means and extending forwardly of said frame outwardly of said side frame members, a brace extending between and connected to said lifting beams adjacent their forward ends, and means mounted on said side frame members for raising said lifting beams.

5. A unitary lifting attachment for tractors comprising a frame having longitudinally extending side frame members, means for fixedly securing said frame to a tractor, a pair of lifting beams pivotally mounted on opposite sides of said frame adjacent the rear thereof, bell cranks pivotally mounted on said side frame members intermediate the ends thereof, one arm of each bell crank having slidable connection with one of said beams, and a hydraulic cylinder and piston mechanism having one of its ends connected to the other arm of each bell crank and its other end connected to one of said beams, said hydraulic cylinder and piston mechanisms being operative to swing said bell cranks to raise said lifting beams.

6. A tractor lifting apparatus comprising a frame having longitudinally extending side frame members, means for securing fixedly said frame to a tractor, a pair of lifting beams pivotally mounted on opposite sides of said frame adjacent the rear thereof, bell cranks mounted on said side frame members, a roller carried by one arm of each of said bell cranks for rollably supporting one of said lifting beams, and hydraulic means connected to the other arm of each bell crank for swinging same to raise said lifting beams.

7. A tractor lifting apparatus as set forth in claim 6 including a shaft for rotatably mounting each of said rollers, and means carried by said shafts for engaging the tops of said lifting beams to force them downwardly.

8. A tractor lifting apparatus as set forth in claim 7 in which the means carried by said shafts includes a transversely extending member disposed above the beams, and blocks carried by said member for engagement with the tops of the beams.

9. A tractor lifting apparatus comprising a frame having longitudinally extending spaced side frame members, a pair of lifting beams pivotally mounted on opposite sides of said frame adjacent the rear thereof, brackets mounted on said side frame members intermediate the ends thereof and having outwardly extending bearings, bell cranks mounted on said bearings operable to lift said lifting beams, and a tubular shaft extending through said bearings transversely of said frame to strengthen and rigidify same.

10. A tractor lifting apparatus comprising a frame, lifting beams pivotally mounted on said frame adjacent the rear thereof, hydraulic cylinder and piston mechanisms connected to said lifting beams, bell cranks pivotally mounted on said frame, one arm of each bell crank being connected to one of said lifting beams, and the other arm of each bell crank being connected to one of said hydraulic mechanisms, the points of connection of said hydraulic mechanisms with said beams being disposed rearwardly of and above the points of connection of said hydraulic mechanisms with said bell crank arms whereby said hydraulic mechanisms exert an upward component of force on said beams to assist in lifting them.

11. A lifting attachment for tractors comprising a unitary frame having longitudinally extending side frame members connected adjacent their ends by front and rear transversely extending frame members, means for fixedly securing the front frame member to the front pedestal post of a tractor, means for suspending the rear frame member from the draw bar of a tractor with the rear end of the frame disposed below the rear axle housing intermediate the rear wheels, lifting beams pivotally mounted on said side frame members adjacent the rear ends thereof, bell cranks pivotally mounted on said side frame members intermediate the ends thereof and having angularly disposed arms thereon, one arm of each bell crank extending forwardly and downwardly and the other arm rearwardly and downwardly when the beams are in their lowermost positions, the lower ends of said forwardly and downwardly extending arms having sliding connections with their respective lifting beams with which they are associated, and a pair of fluid operated cylinder and piston mechanisms having their forward ends connected to the lower ends of said rearwardly and downwardly extending bell crank arms and their rearward ends connected to said beams, the points of connection of the forward ends of said fluid operated cylinder and piston mechanisms with the rearwardly and downwardly extending arms of the bell cranks being below the points of connection of their rearward ends with the beams, whereby said fluid operated cylinder and piston mechanisms exert a direct lifting action on said beams as well as a turning action on said bell cranks.

LEONARD H. STEER.

References Cited in the file of this patent

UNITED STATES PATENTS

| Number | Name | Date |
|---|---|---|
| 2,064,022 | Maloon | Dec. 15, 1936 |
| 2,094,153 | Harrington | Sept. 28, 1937 |
| 2,435,098 | Pokorny | Jan. 27, 1948 |
| 2,435,651 | Huber | Feb. 10, 1948 |
| 2,469,615 | Templeton | May 10, 1949 |